US007894463B2

(12) United States Patent
Chakrabarti et al.

(10) Patent No.: US 7,894,463 B2
(45) Date of Patent: Feb. 22, 2011

(54) TOPOLOGICAL APPROACH FOR IMPROVING NETWORK AND SYSTEM UTILIZATION IN A NON-UNIFORM NETWORK (75) Inventors: Samita Chakrabarti, Sunnyvale, CA (US); Darrin P. Johnson, Mountain View, CA (US); Eric C. Saxe, Livermore, CA (US)

(73) Assignee: Oracle America, Inc., Redwood Shores, CA (US)

( * ) Notice: Subject to any disclaimer, the term of this patent is extended or adjusted under 35 U.S.C. 154(b) by 516 days.

(21) Appl. No.: 11/602,664

(22) Filed: Nov. 21, 2006

(65) Prior Publication Data
US 2008/0117824 A1   May 22, 2008

(51) Int. Cl.
*H04L 12/56* (2006.01)
(52) U.S. Cl. ...................................... 370/408
(58) Field of Classification Search .............. 370/351, 370/389, 400–408, 229, 235, 236, 236.1, 370/428, 429
See application file for complete search history.

(56) References Cited

U.S. PATENT DOCUMENTS

| 2002/0131409 A1* | 9/2002 | Frank et al. ............... 370/386 |
| 2003/0204623 A1* | 10/2003 | Cain ......................... 709/241 |
| 2005/0120105 A1* | 6/2005 | Popescu et al. ............ 709/223 |
| 2007/0133483 A1* | 6/2007 | Lee et al. .................. 370/338 |
| 2007/0153707 A1* | 7/2007 | Thubert et al. ............ 370/254 |

* cited by examiner

*Primary Examiner*—Kwang B Yao
*Assistant Examiner*—Obaidul Huq
(74) *Attorney, Agent, or Firm*—Park, Vaughan, Fleming & Dowler LLP; Shun Yao (57) ABSTRACT

One embodiment of the present invention provides a system that facilitates improved resource allocation in a network. During operation, the system determines one or more metrics value for a node based on a characteristic of the node and assigns nodes within the network to access groups based on each node's characteristic-metric value and a grouping policy. The system further constructs a logical hierarchy of access groups based on the characteristic-metric values of the nodes within each access group. Additionally, the system allows a node to forward traffic to a next-hop node identified within an access group on a logical hierarchy level, thereby facilitating better resource allocation in the network.

24 Claims, 4 Drawing Sheets

TOPOLOGICAL APPROACH FOR IMPROVING NETWORK AND SYSTEM UTILIZATION IN A NON-UNIFORM NETWORK

BACKGROUND

1. Field of the Invention

The present invention relates to the design of networks. More specifically, the present invention relates to a method and system for improving network and system utilization in a non-uniform network.

2. Related Art

The proliferation of mobile computing and communication devices is driving revolutionary changes in our society. As we transition from a personal computing age into a ubiquitous computing age, one can use, at the same time, several electronic devices to access information whenever and wherever the information is needed.

Mobile computing devices are typically designed to run specific types of applications. For example, mobile users can use cell phones to check e-mail and news. Travelers can surf the Internet with portable computers at airports, railway stations, and coffee shops. Tourists can use Internet-enabled Global Positioning System (GPS) in rental cars to locate attractions. Researchers can synchronize data and transfer files between their personal digital assistants (PDAs) and their office or home computers. Moreover, these computing and communication devices can have very different characteristics.

As a result, today's networks, both fixed and ad-hoc, have never been more dynamic and heterogeneous. Network nodes can frequently join, leave, or move within a network, causing the network topology to change constantly. Nodes may also have drastically different characteristics such as processing power, memory capacity, signal-detection strength, battery power, transmission range, etc. In addition, each node can have traffic-specific requirements for transmission power, bandwidth, or latency. For instance, a hand-held mobile device often requires low-latency for instant messaging or voice communications, but may not need large bandwidth. In contrast, a portable computer used for Internet browsing or media streaming may not be sensitive to latency but may require a high-bandwidth link.

To accommodate such dynamic network environments, researchers have proposed several ad-hoc routing schemes. Most ad-hoc routing schemes allow a mobile node to forward packets generated by other nodes. Hence, any ad-hoc node can function as a router.

However, the flexibility of ad-hoc routing comes with the inevitable inefficiency. An ad-hoc node typically has little knowledge of its next-hop neighbor (or neighbor's neighbor), except for the neighbor's Internet Protocol (IP) address and its ability to forward packets. Consequently, a node can "blindly" rely on a neighbor node which is not suitable for forwarding packets for a specific application. For example, a portable computer attempting to stream a high-resolution video clip via a nearby mobile phone can jam the phone and frustrate the user. Furthermore, the network utilization can suffer when a large amount of such unsuccessful forwarding is present.

Note that, in a wireless network, a node's neighbor is typically defined as another node within the transmission range. In a fixed network, a node's neighbor refers to any node that can receive the node's local link broadcast. Thus, the neighbor of a node's neighbor may not be reachable from the sender node, but certain conventional routing schemes allow the node to learn the number of hops and IP address of a neighbor's neighbor. Such knowledge may require flooding in the network, which is not ideal in an ad-hoc network in terms of energy consumption and network traffic. Alternatively, controlled flooding can be used for facilitating knowledge of the neighbor of a node's neighbor.

Hence, what is needed is a method that can improve the utilization of a dynamic, heterogeneous network while retaining the flexibility of ad-hoc routing.

SUMMARY

One embodiment of the present invention provides a system that facilitates improved resource allocation in a network. During operation, the system determines a metric value for a node based on one or more characteristics of the node and assigns nodes within the network to access groups based on each node's characteristic-metric value and a grouping policy. The system further constructs a logical hierarchy of access groups based on the characteristic-metric values of the nodes within each access group. Additionally, the system allows a node to forward traffic to a next-hop node identified within an access group on a logical hierarchy level, thereby facilitating better resource allocation in the network. Thus, it is expected that embodiments of the present invention will improve total packet flow and reduce latency in the ad-hoc networks by reducing packet loss and taking an effective path based on the network conditions, traffic policy, and proper system utilization.

In a variation on this embodiment, the node characteristic based on which the metric value is determined comprises at least one of: transmission power, reception sensitivity, link bandwidth, link latency, storage capacity, and processing power.

In a variation on this embodiment, assigning the nodes to access groups involves arranging into the same access group nodes which can reach each other with one hop and whose characteristic-metric values are within a given range. Further, constructing the logical hierarchy involves forming a number of hierarchy levels based on different ranges of the characteristic-metric values.

In a further variation, each hierarchy level includes one or more access groups. An access group on each hierarchy level is a subset of an access group on a higher hierarchy level.

In a variation on this embodiment, allowing the node to forward traffic to the next-hop node involves identifying the next-hop node by performing the following steps (a) and (b) iteratively: (a) communicating with one or more nodes within the present access group, to which the node belongs, to determine whether at least one next-hop node exists in the present access group; and (b) under the condition that the next-hop node is not identified within the present access group, setting an access group on the next higher hierarchy level which is a parent of the present access group as the present access group. The conditions in steps (a) and (b) correspond to a policy-based hierarchy. Typically, at least one node, which is the next-hop node, in the access groups is accessible by the sender node.

Note that each access group is a policy-based group which at least contains the next-hop node. An access group may or may not contain information of additional nodes in the path to the destination. At least one next-hop node from each access group is reachable from the sender node. Furthermore, the access-group hierarchy is determined by the preferences of policies at the local node, i.e., sender node or forwarder node.

An access group may be based on one or more routing metrics such as distance, transmission power, buffering capability, link capacity, etc.

In a variation on this embodiment, the system determines the node characteristic based on which the metric value is determined according requirements of the traffic.

In a variation on this embodiment, the system allows the node to join or leave an access group or move from one access group to another access group.

BRIEF DESCRIPTION OF THE FIGURES

TABLE I presents a set of exemplary grouping and hierarchy configurations for a heterogeneous network as is illustrated in FIG. 2.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not limited to the embodiments shown, but is to be accorded the widest scope consistent with the claims.

The data structures and processes described in this detailed description are typically stored on a computer readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Today's ad-hoc networks drastically differ from conventional fixed networks. The mobile devices which constitute the network nodes often have different processing or communication capabilities, and can change their locations frequently. Consequently, the network topology can constantly evolve. Traditional routing approaches are inadequate for ad-hoc networks, because such approaches generally require dedicated, stable routers to establish substantially static routing tables, which is nearly impossible in an ad-hoc network.

Ad-hoc routing schemes obviate the need for static routing tables by allowing nodes to discover routes "on the fly." Using ad-hoc routing, any node can function as a router and forward traffic from another node. Mobile devices therefore need not rely on fixed, dedicated routers to send or receive traffic. One drawback of existing ad-hoc routing schemes, however, is that an ad-hoc node does not differentiate next-hop nodes with regard to their processing and communication capabilities. Such "blind" forwarding can limit network utilization, throughput, and/or latency.

Embodiments of the present invention combine the flexibility of ad-hoc routing and the efficient resource utilization of fixed networks. Using grouping policies, which correspond to various node characteristics, ad-hoc nodes form so called "access groups" and selectively forward traffic based on access groups, traffic requirements, and physical connectivity.

Access Groups and Logical Hierarchy

In general, non-uniform networks include both mobile, ad-hoc nodes and fixed nodes with stable access to a fixed network infrastructure. In one embodiment, nodes in a non-uniform network are grouped based on a set of given policies. For example, nodes with a certain level of transmission power or signal detection strength, or nodes within certain proximity with each other, form the same access group. In general, a grouping policy includes one or more characteristic metrics, and the metric values of group members are within a given range. Such metrics can include transmission power, reception sensitivity, link bandwidth, link latency, storage capacity, and processing power. For example, an access group can include nodes which can communicate with each other with a transmission power lower than 20 dB, or nodes whose transmission speed is at least 64 kbps, or nodes which satisfy both conditions.

Different access groups with similar metrics then form a logical hierarchy, wherein an access group is always a subset of an access group on a higher hierarchy level. That is, an access group on a higher hierarchy level is a superset of access groups on a lower hierarchy level. For instance, on the first, or lowest, hierarchy level, an access group may include nodes which can communicate with each other with a transmission power lower than 20 dB. On the second hierarchy level, an access group includes nodes which can communicate with each other with a transmission power lower than 40 dB. In a further embodiment, an access group on the second level can simply include several first-level access groups.

When forwarding traffic, a node first searches its own access group for an available next-hop node. If unsuccessful, the node then expands the search space by searching within an access group on the second level which includes other level-one access groups based on preferences of policies at the local node. Typically, a higher-level group contains a lower-level group's nearest resources. The node performs this search process iteratively along the hierarchy with an increasing search space until a viable next-hop node is identified.

Note that the construction of logical hierarchy can be based on pre-determined rules, physical parameters, or on any user-defined policies. In one embodiment, an access group on a higher level can simply be a superset of a number of lower-level access groups. For example, an access group on level two can comprise several level-one access groups, and an access group on level three can comprise several level-two access groups. In a further embodiment, the formation of a higher-level access group can be based on a widened range of one or more metrics based on which the lower-level access groups are formed.

Figure 1:
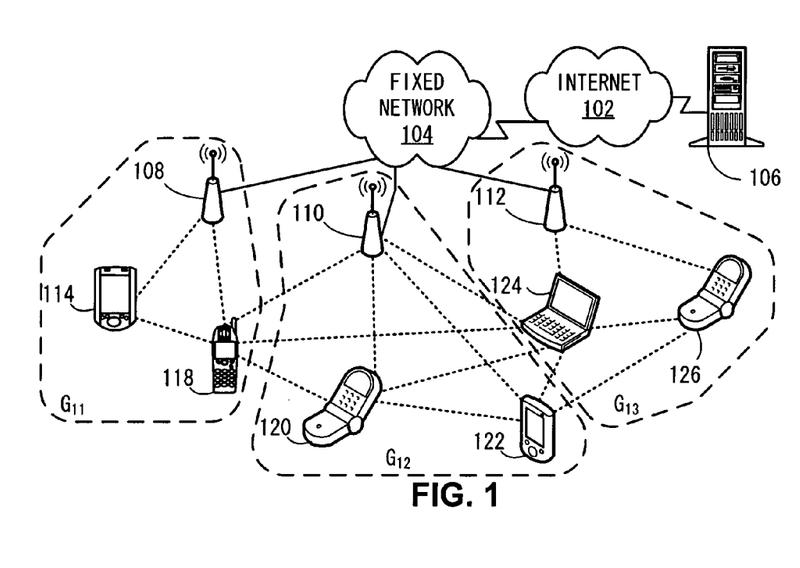
FIG. 1 illustrates an exemplary heterogeneous network which includes fixed access points and mobile wireless devices in accordance with an embodiment of the present invention.

FIG. 1 illustrates an exemplary heterogeneous network which includes fixed access points and mobile wireless devices in accordance with an embodiment of the present invention. A fixed access network 104 couples three wireless access points, 108, 110, and 112 to the Internet 102. Each access point is also in communication with a number of wireless devices.

For example, access point 108 is in communication with a PDA 114 and a mobile phone 118; access point 110 is in communication with mobile phone 118, a hand-held device 120, a PDA 122, and a portable computer 124; and access point 112 is in communication with portable computer 124 and a hand-held device 126. Assume that the nodes which can reach each other with a transmission power less than 20 dB form an access group. For illustration purposes, assume further that the nodes form the following level-one access groups as indicated by dashed-line circles: group $G_{11}$ includes access point 108, PDA 114, and mobile phone 118; group $G_{12}$ includes access point 110, hand-held device 120, and PDA 122; and group $G_{13}$ includes access point 112, portable computer 124, and hand-held device 126. Note that $G_{ij}$ denote access group j on level i. Groups $G_{11}$, $G_{12}$, and $G_{13}$ are first-level access groups. On level two of the logical hierarchy are three access groups: $G_{21}=G_{11} \cup G_{12}$, $G_{22}=G_{11} \cup G_{12} \cup G_{13}$, and $G_{23}=G_{12} \cup G_{13}$. Furthermore, $G_{21}$, $G_{22}$, $G_{23}$ are the parent groups of $G_{11}$, $G_{12}$, and $G_{13}$, respectively. Note that the group formation described above is only for a particular grouping policy. Other grouping policies can result in different formation.

When mobile phone 118 attempts to forward traffic destined to a server 106 through the Internet 102, mobile phone 118 first selects a grouping policy based on the type of traffic and its own physical characteristics. Assume that mobile phone 118 adopts the 20-dB transmission-power grouping policy as is described above. Mobile phone 118 then obtains the grouping-formation information and searches group $G_{11}$ for an available next-hop node. If a next-hop node is not available, mobile phone 118 expands its search space to $G_{11}$'s parent group, $G_{21}$, which includes both $G_{11}$ and $G_{12}$. If the search is unsuccessful, the search can further include a level-three access group which is a parent of $G_{21}$ and includes $G_{21}$ and $G_{22}$. Note that if the next-hop node is within $G_{12}$, the transmission power required for mobile phone 118 to reach the next-hop node can be higher than 20 dB.

Figure 2:
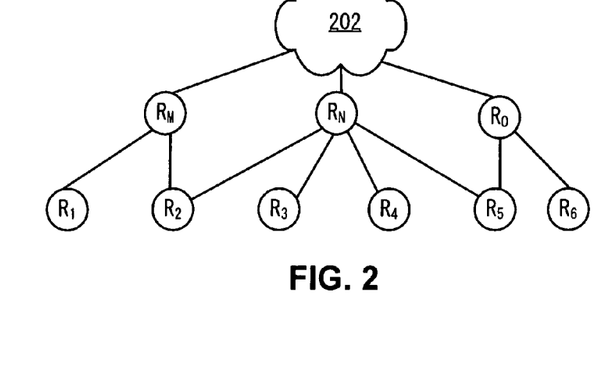
FIG. 2 illustrates a logical abstraction of access groups and construction of hierarchies in accordance with an embodiment of the present invention.

FIG. 2 illustrates a logical abstraction of access groups and construction of hierarchies in accordance with an embodiment of the present invention. Fixed nodes $R_M$, $R_N$, and $R_O$ have static access to a fixed network 202. Hence, $R_M$, $R_N$, and $R_O$ are one hop away from fixed network 202.

Each fixed node is also in communication with a number of ad-hoc nodes. $R_M$ is in communication with ad-hoc nodes $R_1$ and $R_2$; $R_N$ is in communication with $R_2$, $R_3$, and $R_4$; and $R_O$ is in communication with $R_5$ and $R_6$. In this example, these ad-hoc and fixed nodes can form different access groups and hierarchies based on different grouping policies, such as transmission power, buffering capacity, and available bandwidth. TABLE I presents a set of exemplary grouping and hierarchy configurations.

As is shown in TABLE I, under a bandwidth-based grouping policy, the level-one access groups are $G_{11}(R_1, R_M)$, $G_{12}(R_2, R_M)$, $G_{13}(R_3, R_4, R_N)$, and $G_{14}(R_5, R_6, R_O)$. The corresponding level-two parent groups are $G_{21}=G_{11} \cup G_{12}$, $G_{22}=G_{11} \cup G_{12} \cup G_{13}$, $G_{23}=G_{12} \cup G_{13} \cup G_{14}$, and $G_{24}=G_{13} \cup G_{14}$.

Under a buffering-capacity-based policy, the level-one access groups are $G_{11}(R_1, R_2, R_M)$, $G_{12}(R_3, R_4, R_N)$, and $G_{13}(R_5, R_6, R_O)$. The corresponding level-two parent groups are $G_{21}=G_{11} \cup G_{12}$, $G_{22}=G_{11} \cup G_{12} \cup G_{13}$, and $G_{23}=G_{12} \cup G_{13}$.

Under a transmission-power-based policy, the level-one access groups are $G_{11}(R_1, R_M)$, $G_{12}(R_2, R_3, R_4, R_5, R_N)$, and $G_{13}(R_5, R_6, R_O)$. The corresponding level-two parent groups are $G_{21}=G_{11} \cup G_{12}$, $G_{22}=G_{11} \cup G_{12} \cup G_{13}$, and $G_{23}=G_{12} \cup G_{13}$.

TABLE I

| Grouping Policy | Level-1 Access Groups | Level-2 Parent Groups |
| --- | --- | --- |
| Bandwidth based | $G_{11} (R_1, R_M)$ | $G_{21} = G_{11} \cup G_{12}$ |
|  | $G_{12} (R_2, R_M)$ | $G_{22} = G_{11} \cup G_{12} \cup G_{13}$ |
|  | $G_{13} (R_3, R_4, R_N)$ | $G_{23} = G_{12} \cup G_{13} \cup G_{14}$ |
|  | $G_{14} (R_5, R_6, R_O)$ | $G_{24} = G_{13} \cup G_{14}$ |
| Buffering capacity based | $G_{11} (R_1, R_2, R_M)$ | $G_{21} = G_{11} \cup G_{12}$ |
|  | $G_{12} (R_3, R_4, R_N)$ | $G_{22} = G_{11} \cup G_{12} \cup G_{13}$ |
|  | $G_{13} (R_5, R_6, R_O)$ | $G_{23} = G_{12} \cup G_{13}$ |
| Transmission-power based | $G_{11} (R_1, R_M)$ | $G_{21} = G_{11} \cup G_{12}$ |
|  | $G_{12} (R_2, R_3, R_4, R_5, R_N)$ | $G_{22} = G_{11} \cup G_{12} \cup G_{13}$ |
|  | $G_{13} (R_5, R_6, R_O)$ | $G_{23} = G_{12} \cup G_{13}$ |

Figure 3:
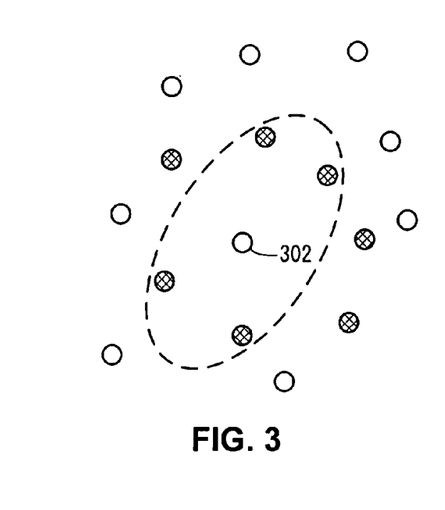
FIG. 3 illustrates an exemplary logical access-group configuration based on proximity and bandwidth of mobile devices in accordance with an embodiment of the present invention.

FIG. 3 illustrates an exemplary logical access-group configuration based on proximity and bandwidth of mobile devices in accordance with an embodiment of the present invention. An ad-hoc node 302 can reach a number of nodes within one hop, which are shaded with cross-hatch patterns. In this example, node 302 selects a grouping policy based on available bandwidth. For example, only nodes which can be reached within one hop and which has at least 128 Kbps available bandwidth can be in the same access group. The resulting access group, indicated by a dashed-line circle, includes node 302 and four other nodes within one hop's reach from node 302. Note that the other three shaded nodes can belong to other access groups on the same level.

Field Application

Figure 4:
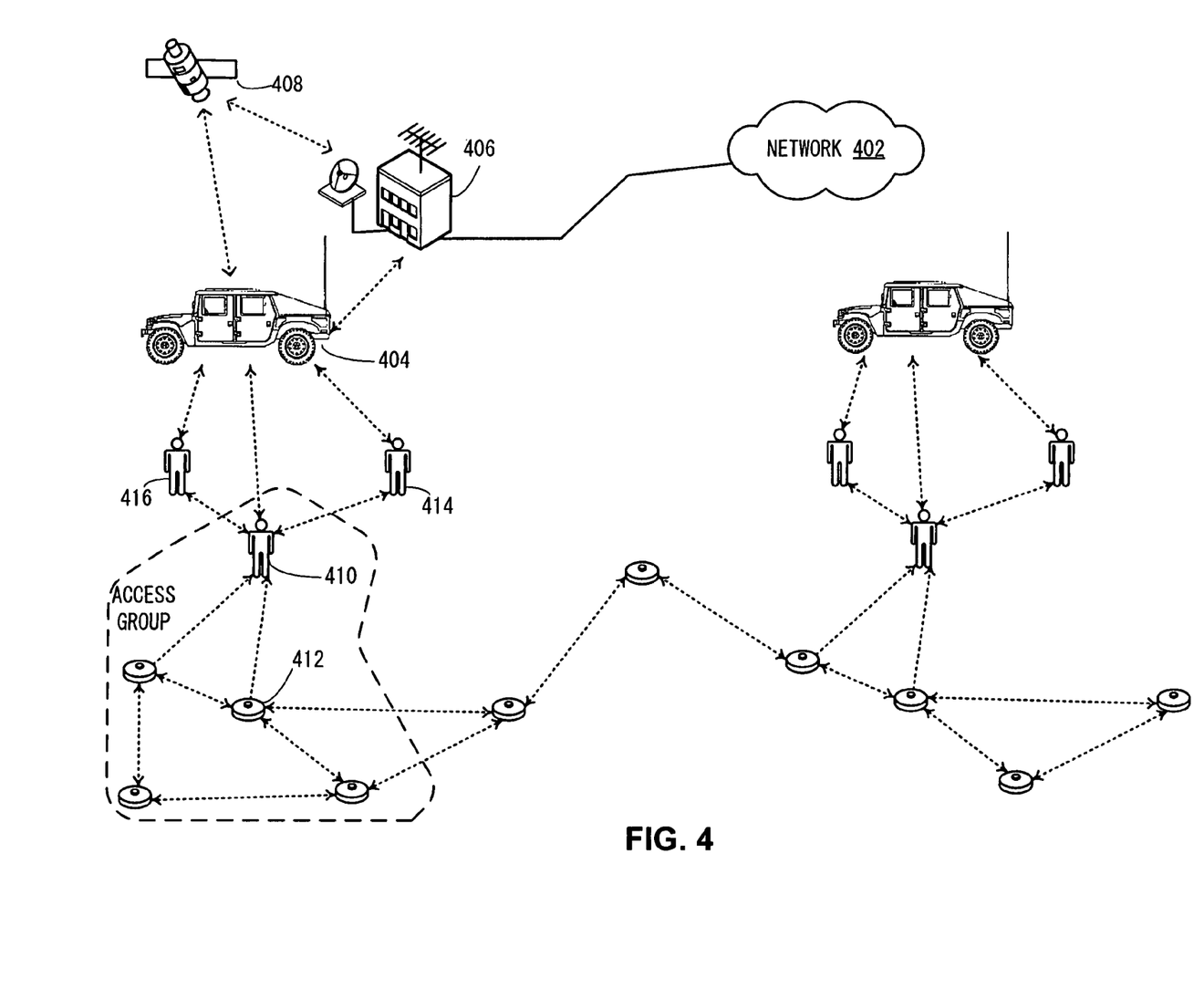
FIG. 4 illustrates an exemplary application of access-group based traffic forwarding in accordance with an embodiment of the present invention.

FIG. 4 illustrates an exemplary military field application of access-group based traffic forwarding in accordance with an embodiment of the present invention. In this example, a number of "smart" land mines, such as land mine 412, are deployed in the battlefield. Each land mine is equipped with a communication device and has a limited power supply. Hence, a land mine can periodically communicate with its neighbors regarding its state and location.

As a friendly troop approaches the battlefield, the soldiers would want to collect the location and status information of the land mines. Because each land mine has limited transmission power, several land mines can form an access group based on transmission power. As a soldier 410 approaches land mine 412, soldier 410's communication device joins the access group to which land mine 412 belongs, and can receive information from all the land mines within that group. Note that soldier 410 can leave the access group, and soldiers 414 and 416 can also join the access group at any time.

Soldier 410's communication device further attempts to relay the land mine information back to a mobile station, which in this example is a High Mobility Multipurpose Wheeled Vehicle (HMMWV, or "HUMVEE") 404. Note that soldier 410's communication device cannot find another next-hop node within this access group, because all the other nodes within the group are land mines which cannot reach HUMVEE 404. Hence, soldier 410's communication device searches its parent group which includes the communication devices of soldiers 412 and 414, and HUMVEE 404. HUM- VEE 404 subsequently relays the land-mine information to a command center 406 with a fixed access to a network 402 and a link to a satellite 408.

Exemplary Implementation

In one embodiment, the access-group formation process and the construction of hierarchy can be performed by a central node. Each ad-hoc node collects the information regarding its neighbors and the metric values according to the grouping policy, and communicates this information to a central node. In a further embodiment, the grouping process and construction of hierarchy can be performed in a distributed manner by each node.

Figure 5:
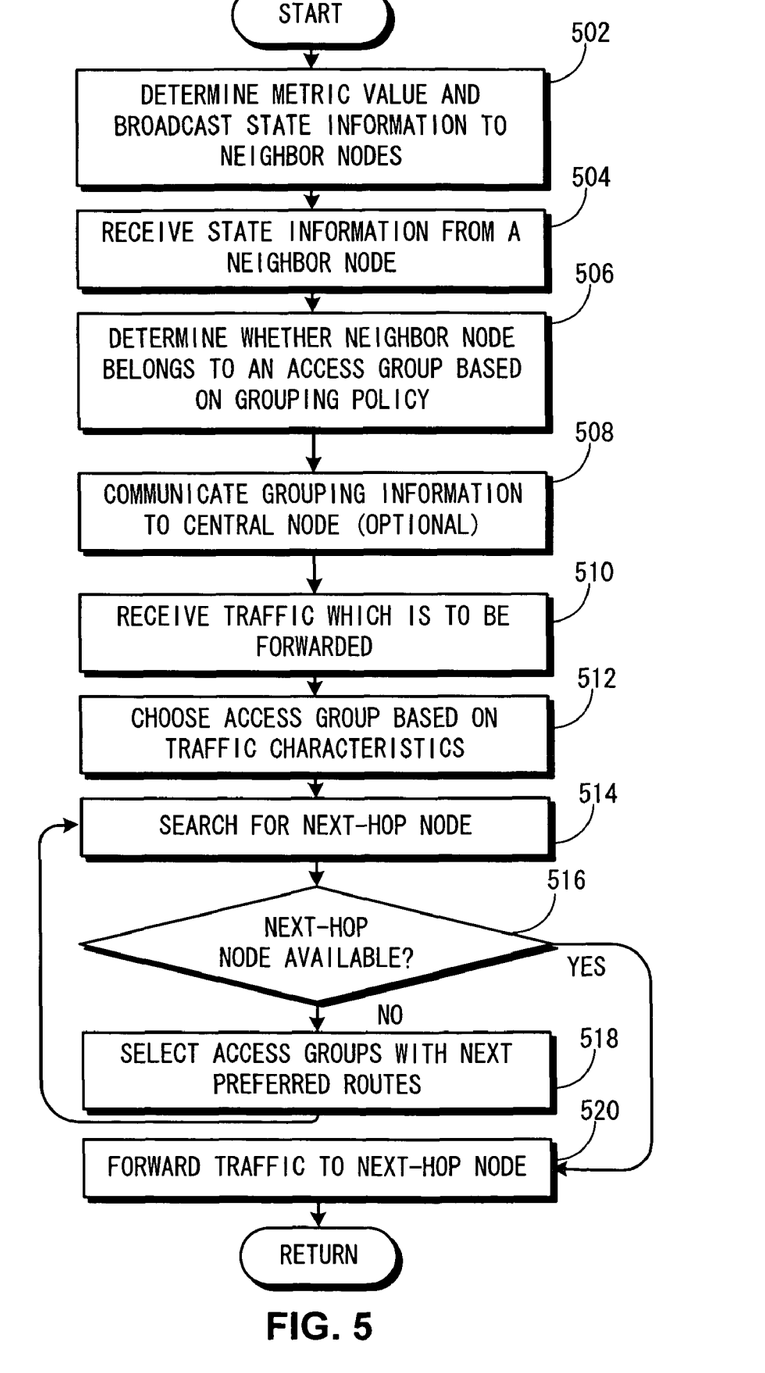
FIG. 5 presents a flow chart illustrating the process of establishing an access group and forwarding traffic based on the access group in accordance with an embodiment of the present invention.

FIG. 5 presents a flow chart illustrating the process of establishing an access group and forwarding traffic based on the access group in accordance with an embodiment of the present invention. The system starts by determining a metric value for the local node and broadcasting its state information to the neighbor nodes (step 502). The system also receives state information from a neighbor node (step 504), and determines whether the neighbor node belongs to an access group based on the grouping policy (step 506). Optionally, the system further communicates the grouping information to a central node (step 508).

Note that the system is not limited to considering only one metric. The system can base its routing decision on multiple metrics, evaluate these metrics either independently or jointly, and can reach one or more routing decisions. One way to handle multiple node characteristics is to construct a per-characteristic node hierarchy. Then, based on the metric for which one is optimizing, the appropriate node hierarchy can be consulted. Where one wishes to optimize for multiple characteristics, for example link bandwidth and storage capacity, the respective access groups in both hierarchies can be intersected to produce a new access group containing the desirable nodes based on both characteristics.

The system then receives traffic which is to be forwarded (step 510). Based on the traffic characteristics, the system chooses an access group (step 512) and searches for a next-hop node within the chosen access group (step 514). Subsequently, the system determines whether a next-hop node is available (step 516). If available, the system forwards the traffic to the next-hop node (step 520) and returns. Otherwise, the system selects access groups with the next-preferred routes (step 518) and searches again (step 514).

Figure 6:
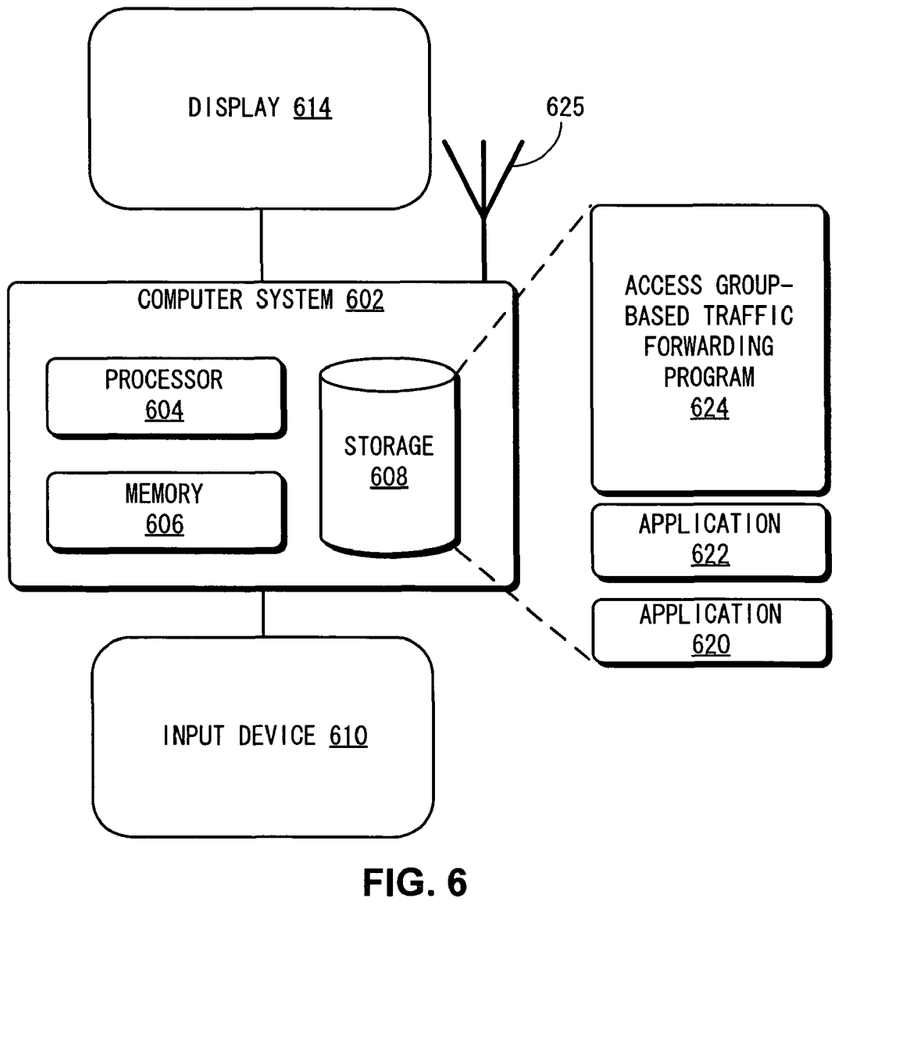
FIG. 6 illustrates an exemplary computer system which performs access-group-based traffic forwarding in accordance with an embodiment of the present invention.

FIG. 6 illustrates an exemplary computer system which performs access-group-based traffic forwarding in accordance with an embodiment of the present invention. A computer system 602 includes a processor 604, a memory 606, and a storage 608. Further coupled to computer system 602 are a display 614, an input device 610, and a communication mechanism 625.

Storage 608 contains applications 622 and 620, and an access group-based traffic forwarding program 624. During operation, computer system 602 runs program 624 to form access groups, construct logical hierarchies, and to forward traffic based on the access groups. Computer system 602 can be a mobile phone, a PDA, a hand-held device, a portable computer, or any communication device. Additionally, other implementations of embodiments of the present invention are also possible.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating improved resource allocation and utilization in a network, the method comprising:
    determining a set of metric values for each node in a set of nodes in the network, wherein each metric value corresponds to a different characteristic for the node;
    for each characteristic for each node:
        using the metric values corresponding to the characteristic for other nodes in the set of nodes to assign the other nodes to access groups based on a grouping policy; and
        constructing a logical hierarchy of the access groups for the characteristic for the node;
    receiving traffic that is to be forwarded from a first node in the set of nodes to a next-hop node;
    determining a set of target metric values for a set of characteristics for the next-hop node based on the traffic;
    for each characteristic in the set of characteristics for the next-hop node, intersecting access groups in the logical hierarchies for the first node corresponding to the characteristic for the next-hop node, wherein intersecting the access groups involves creating a combined access group that includes the next-hop node;
    identifying the next-hop node within the combined access group; and
    forwarding the traffic.

2. The method of claim 1, wherein the node characteristic based on which the metric value is determined includes at least one of:
    transmission power;
    reception sensitivity;
    link bandwidth;
    link latency;
    storage capacity; and
    processing power.

3. The method of claim 1,
    wherein assigning the nodes to access groups involves including in the same access group nodes which can reach each other with one hop and whose characteristic-metric values are within a given range; and
    wherein constructing the logical hierarchy involves forming a number of hierarchy levels based on different ranges of the characteristic-metric values and one or more routing preferences.

4. The method of claim 3,
    wherein each hierarchy level includes one or more access groups; and
    wherein an access group on each hierarchy level is a subset of an access group on a higher hierarchy level.

5. The method of claim 1, wherein identifying the next-hop node involves performing the following steps (a) and (b) iteratively:
    (a) communicating with one or more nodes within a present access group, to which the node belongs, to determine whether at least one next-hop node exists in the present access group; and
    (b) under the condition that the next-hop node is not identified within the present access group, setting an access group on the next higher hierarchy level which is a parent of the present access group as the present access group.

6. The method of claim 1, further comprising determining the set of target metric values for the set of characteristics for the next-hop node according requirements of the traffic.

7. The method of claim 1, further comprising allowing the node to:
  join or leave an access group; or
  move from one access group to another access group.

8. The method of claim 1, wherein assigning nodes to access groups involves evaluating a number of metric values of each node.

9. A non-transitory computer-readable storage medium storing instructions that when executed by a computer cause the computer to perform a method for facilitating improved resource allocation and utilization in a network, the method comprising:
  determining a set of metric values for each node in a set of nodes in the network, wherein each metric value corresponds to a different characteristic for the node;
  for each characteristic for each node:
  using the metric values corresponding to the characteristic for other nodes in the set of nodes to assign the other nodes to access groups based on a grouping policy; and
  constructing a logical hierarchy of the access groups for the characteristic for the node;
  receiving traffic that is to be forwarded from a first node in the set of nodes to a next-hop node;
  determining a set of target metric values for a set of characteristics for the next-hop node based on the traffic;
  for each characteristic in the set of characteristics for the next-hop node, intersecting access groups in the logical hierarchies for the first node corresponding to the characteristic for the next-hop node, wherein intersecting the access groups involves creating a combined access group that includes the next-hop node;
  identifying the next-hop node within the combined access group; and
  forwarding the traffic.

10. The non-transitory computer-readable storage medium of claim 9, wherein the node characteristic based on which the metric value is determined includes at least one of:
  transmission power;
  reception sensitivity;
  link bandwidth;
  link latency;
  storage capacity; and
  processing power.

11. The non-transitory computer-readable storage medium of claim 9,
  wherein assigning the nodes to access groups involves including in the same access group nodes which can reach each other with one hop and whose characteristic-metric values are within a given range; and
  wherein constructing the logical hierarchy involves forming a number of hierarchy levels based on different ranges of the characteristic-metric values and one or more routing preferences.

12. The non-transitory computer-readable storage medium d of claim 11,
  wherein each hierarchy level includes one or more access groups; and
  wherein an access group on each hierarchy level is a subset of an access group on a higher hierarchy level.

13. The non-transitory computer-readable storage medium of claim 9, wherein identifying the next-hop node involves performing the following steps (a) and (b) iteratively:
  (a) communicating with one or more nodes within a present access group, to which the node belongs, to determine whether at least one next-hop node exists in the present access group; and
  (b) under the condition that the next-hop node is not identified within the present access group, setting an access group on the next higher hierarchy level which is a parent of the present access group as the present access group.

14. The non-transitory computer-readable storage medium of claim 9, wherein the method further comprises determining the set of target metric values for the set of characteristics for the next-hop node according to requirements of the traffic.

15. The non-transitory computer-readable storage medium of claim 9, wherein the method further comprises allowing the node to:
  join or leave an access group; or
  move from one access group to another access group.

16. The non-transitory computer-readable storage medium of claim 9, wherein assigning nodes to access groups involves evaluating a number of metric values of each node.

17. A computer system that facilitates improved resource allocation and utilization in a network, the computer system comprising:
  a metric evaluation mechanism in a processor in the computer system configured to determine a set of metric values for each node in a set of nodes in the network, wherein each metric value corresponds to a different characteristic for the node;
  a grouping mechanism in the processor configured to, for each characteristic for each node, use the metric values corresponding to the characteristic for other nodes in the set of nodes to assign the other nodes to access groups based on a grouping policy;
  a hierarchy construction mechanism in the processor configured to construct a logical hierarchy of the access groups for the characteristic for the node; and
  a traffic forwarding mechanism in the processor configured to:
  receive traffic that is to be forwarded from a first node in the set of nodes to a next-hop node;
  determine a set of target metric values for a set of characteristics for the next-hop node based on the traffic;
  for each characteristic in the set of characteristics for the next-hop node, intersect access groups in the logical hierarchies for the first node corresponding to the characteristic for the next-hop node, wherein intersecting the access groups involves creating a combined access group that includes the next-hop node;
  identify the next-hop node within the combined access group; and
  forward the traffic.

18. The computer system of claim 17, wherein the node characteristic based on which the metric value is determined includes at least one of:
  transmission power;
  reception sensitivity;
  link bandwidth;
  link latency;
  storage capacity; and
  processing power.

19. The computer system of claim 17,
  wherein while assigning the nodes to access groups, the grouping mechanism is configured to include in the same access group nodes which can reach each other with one hop and whose characteristic-metric values are within a given range; and
  wherein while constructing the logical hierarchy, the hierarchy construction mechanism is configured to form a number of hierarchy levels based on different ranges of the characteristic-metric values and one or more routing preferences.

20. The computer system of claim 19,
wherein each hierarchy level includes one or more access groups; and
wherein an access group on each hierarchy level is a subset of an access group on a higher hierarchy level.

21. The computer system of claim 17, wherein the traffic forwarding mechanism is configured to identify the next-hop node by performing the following steps (a) and (b) iteratively:
(a) communicating with one or more nodes within a present access group, to which the node belongs, to determine whether at least one next-hop node exists in the present access group; and
(b) under the condition that the next-hop node is not identified within the present access group, setting an access group on the next higher hierarchy level which is a parent of the present access group as the present access group.

22. The computer system of claim 17, wherein the traffic forwarding mechanism is configured to determine the set of target metric values for the set of characteristics for the next-hop node according to requirements of the traffic.

23. The computer system of claim 17, wherein the grouping mechanism is further configured to allow the node to:
join or leave an access group; or
move from one access group to another access group.

24. The computer system of claim 17, wherein while assigning nodes to access groups, the grouping mechanism is configured to evaluate a number of metric values for each node.

* * * * *